(12) United States Patent
Sakai

(10) Patent No.: US 11,077,502 B2
(45) Date of Patent: Aug. 3, 2021

(54) CUTTING INSERT, CUTTING TOOL, AND METHOD OF MANUFACTURING MACHINED PRODUCT

(71) Applicant: KYOCERA CORPORATION, Kyoto (JP)

(72) Inventor: Kohei Sakai, Duesseldorf (DE)

(73) Assignee: KYOCERA CORPORATION, Kyoto (JP)

( * ) Notice: Subject to any disclaimer, the term of this patent is extended or adjusted under 35 U.S.C. 154(b) by 193 days.

(21) Appl. No.: 16/310,506

(22) PCT Filed: Jun. 15, 2017

(86) PCT No.: PCT/JP2017/022070
§ 371 (c)(1),
(2) Date: Dec. 17, 2018

(87) PCT Pub. No.: WO2017/217481
PCT Pub. Date: Dec. 21, 2017

(65) Prior Publication Data
US 2019/0314901 A1    Oct. 17, 2019

(30) Foreign Application Priority Data
Jun. 17, 2016    (JP) .............................. JP2016-120709

(51) Int. Cl.
*B23B 27/16*    (2006.01)
*B23B 27/22*    (2006.01)

(52) U.S. Cl.
CPC ........... *B23B 27/1611* (2013.01); *B23B 27/22* (2013.01); *B23B 2200/0476* (2013.01); *B23B 2210/08* (2013.01)

(58) Field of Classification Search
CPC ......... B23B 2200/0476; B23B 27/1611; B23B 27/22; B23B 2210/08; B23B 27/00; B23B 27/14
See application file for complete search history.

(56) References Cited

U.S. PATENT DOCUMENTS

| | | | |
|---|---|---|---|
| 5,006,020 A * | 4/1991 | Roos ..................... | B23B 27/145 407/113 |
| 7,390,148 B2 * | 6/2008 | Krenzer ................ | B23B 27/141 407/113 |

(Continued)

FOREIGN PATENT DOCUMENTS

| JP | S5969802 U | 5/1984 |
|---|---|---|
| JP | S6231215 Y2 | 8/1987 |

(Continued)

*Primary Examiner* — Sara Addisu
(74) *Attorney, Agent, or Firm* — Viering, Jentschura & Partner mbB

(57) ABSTRACT

A cutting insert includes an upper surface, a lower surface, a side surface, and a cutting edge. The upper surface includes a first side part, a second side part, and a corner part located between the first side part and the second side part. The side surface is located between the upper surface and the lower surface. The cutting edge is located at an intersection of the upper surface and the side surface. The cutting edge includes a first cutting edge located at the corner part, and a second cutting edge adjacent to the first cutting edge and located at the first side part. A height of the first cutting edge relative to the lower surface is constant. The second cutting edge is inclined toward the lower surface as going toward the corner part.

14 Claims, 14 Drawing Sheets

(56) References Cited

U.S. PATENT DOCUMENTS

| | | | | |
|---|---|---|---|---|
| 7,476,062 B2* | 1/2009 | Waggle | ................ | B23C 5/207 |
| | | | | 407/113 |
| 7,520,701 B2* | 4/2009 | Kukino | ................ | B23B 27/145 |
| | | | | 407/113 |
| 7,765,902 B2* | 8/2010 | Kuroda | ................ | B23B 27/145 |
| | | | | 407/113 |
| 8,087,852 B2* | 1/2012 | Muraki | ................ | B23B 27/20 |
| | | | | 407/101 |
| 10,099,294 B2* | 10/2018 | Furusawa | ................ | B23B 27/143 |
| 10,335,861 B2* | 7/2019 | Ekden | ................ | B23B 27/141 |
| 10,486,239 B2* | 11/2019 | Sasaki | ................ | B23B 27/22 |
| 2006/0228179 A1* | 10/2006 | Alm | ................ | B23B 27/145 |
| | | | | 407/113 |
| 2007/0059110 A1* | 3/2007 | Choi | ................ | B23B 29/08 |
| | | | | 407/113 |
| 2011/0142555 A1* | 6/2011 | Yamazaki | ................ | B23B 27/143 |
| | | | | 407/2 |
| 2012/0128438 A1* | 5/2012 | Tanaka | ................ | B23B 27/141 |
| | | | | 407/115 |
| 2012/0177452 A1* | 7/2012 | Konta | ................ | B23B 27/141 |
| | | | | 407/114 |
| 2012/0230785 A1* | 9/2012 | Chen | ................ | B23B 27/141 |
| | | | | 407/114 |
| 2013/0315682 A1 | 11/2013 | Wahlsten et al. | | |
| 2015/0075338 A1* | 3/2015 | Onodera | ................ | B23B 27/1607 |
| | | | | 82/1.11 |
| 2015/0090081 A1* | 4/2015 | Onodera | ................ | B23B 27/143 |
| | | | | 82/1.11 |
| 2016/0016232 A1 | 1/2016 | Edman et al. | | |
| 2017/0209935 A1* | 7/2017 | Furusawa | ................ | B23B 27/22 |
| 2018/0009040 A1* | 1/2018 | Sasaki | ................ | B23B 27/14 |
| 2018/0111205 A1* | 4/2018 | Ishi | ................ | B23B 27/1611 |
| 2019/0168310 A1* | 6/2019 | Ikeda | ................ | B23B 27/143 |
| 2019/0240740 A1* | 8/2019 | Sakai | ................ | B23B 27/18 |

FOREIGN PATENT DOCUMENTS

| | | | |
|---|---|---|---|
| JP | H0253307 U | | 4/1990 |
| JP | H04115506 U | | 10/1992 |
| JP | 2007190633 A | * | 8/2007 |
| JP | 2007260848 A | * | 10/2007 |
| JP | 2015229240 A | | 12/2015 |

* cited by examiner

US 11,077,502 B2

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/022070 filed on Jun. 15, 2017, which claims priority to Japanese Application No. 2016-120709 filed on Jun. 17, 2016, which are entirely incorporated herein by reference.

TECHNICAL FIELD

The present disclosure relates to a cutting insert, a cutting tool, and a method of manufacturing a machined product.

BACKGROUND

Indexable cutting tools with a cutting insert attached to a holder have been used as a cutting tool used in a cutting process or the like. The cutting insert used for the cutting tool may include a polygonal-shaped upper surface, a side surface, and a cutting edge located at an intersecting part of the upper surface and the side surface. The above-described cutting tool may be capable of cutting out a workpiece by bringing the cutting edge into contact with the workpiece.

Patent Document 1 (Japanese Utility Model Application Publication No. 2-53307) discusses a cutting insert used as a cutting tool. The cutting insert described in Patent Document 1 may include a corner ridge 2a located at a corner part, and a center ridge 2b located elsewhere than the corner part. The corner ridge 2a may be inclined upward as going farther from the corner part in a side view. A flat ridge 2c whose height may be constant in a side view may be disposed at a top portion of the corner ridge 2a.

In recent years, there has been a demand for a cutting insert that achieves good cutting performance under more severe cutting conditions. Particularly, when machining a difficult-to-cut material, such as super heat-resistant alloys, a large cutting load is exerted on the cutting insert. There has been a demand for a cutting insert that also achieves good cutting performance even in such a situation.

In the cutting insert discussed in Patent Document 1, the flat ridge 2c whose height may be constant, and a cutting edge part that may be inclined upward as going farther from the corner part may be disposed only at the corner ridge 2a located at the corner part. When the large cutting load is exerted on the above configuration, primary boundary damage may not be sufficiently reducible.

SUMMARY

A cutting insert according to a non-limiting aspect of the present disclosure includes an upper surface, a lower surface, a side surface, and a cutting edge. Each of the upper surface and the lower surface includes a first side part, a second side part, and a corner part located between the first side part and the second side part. The side surface is located between the upper surface and the lower surface. The cutting edge is located at an intersecting part of the upper surface and the side surface. The cutting edge includes a first cutting edge located at the corner part and a second cutting edge adjacent to the first cutting edge and located at the first side part. A height of the first cutting edge relative to the lower surface is constant. The second cutting edge is inclined so as to go farther from the lower surface as going farther from the corner part.

A cutting tool according to a non-limiting aspect of the present disclosure includes the cutting insert in the present disclosure described above, and a holder designed to attach the cutting insert to the holder.

A method of manufacturing a machined product according to a non-limiting aspect of the present disclosure includes rotating a workpiece, bringing a cutting tool in the present disclosure described above into contact with the workpiece being rotated, and moving the cutting tool away from the workpiece.

DETAILED DESCRIPTION

<Cutting Insert>

Figure 1:
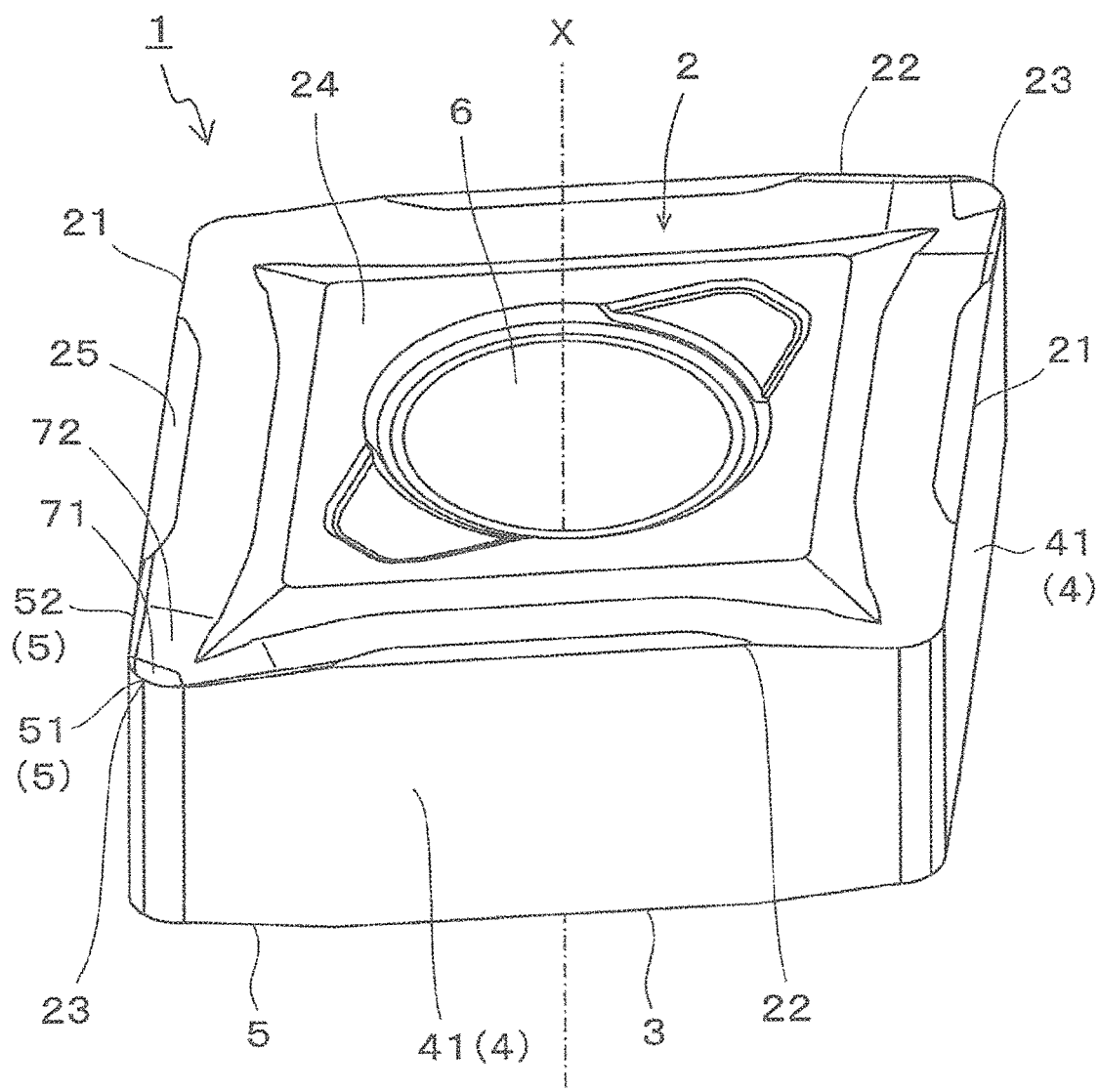
FIG. 1 is a perspective view illustrating a cutting insert in a non-limiting aspect of the present disclosure.

The cutting insert in a non-limiting aspect of the present disclosure is described in detail below with reference to the drawings. For the sake of description, the drawings referred to in the following illustrate, in a simplified form, only main members necessary for describing the non-limiting aspects of the disclosure. The cutting insert in the present disclosure is therefore capable of including any arbitrary structural member not illustrated in the drawings referred to. Sizes of the members in each of the drawings do not faithfully represent actual structural members and size ratios of these members. These points are also true for a cutting tool and a method of manufacturing a machined product described later.

The cutting insert 1 (hereinafter also referred to as "insert 1") in the present non-limiting aspect of the disclosure includes an upper surface 2, a lower surface 3, a side surface 4, a cutting edge 5, and a through hole 6 as illustrated in FIGS. 1 to 4. The upper surface 2 and the lower surface 3 are called for convenience sake and do not indicate up and down directions. For example, the upper surface 2 need not be a surface directed upward when attached to a holder 103 described later.

Firstly, the insert 1 is described in terms of material.

For example, cemented carbide or cermet is usable as a material of the insert 1.

Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

Secondly, the insert 1 is described in terms of shape.

The upper surface 2 has a quadrangular shape, more specifically a rhombus shape when the upper surface 2 is viewed from above (in a top view) as illustrated in FIGS. 1 to 4. The upper surface 2 includes a first side part 21, a second side part 22, and a corner part 23 located between the first side part 21 and the second side part 22 in a top view. The side surface 4 is located between the upper surface 2 and the lower surface 3, and connects to each of the upper surface 2 and the lower surface 3.

Figure 2:
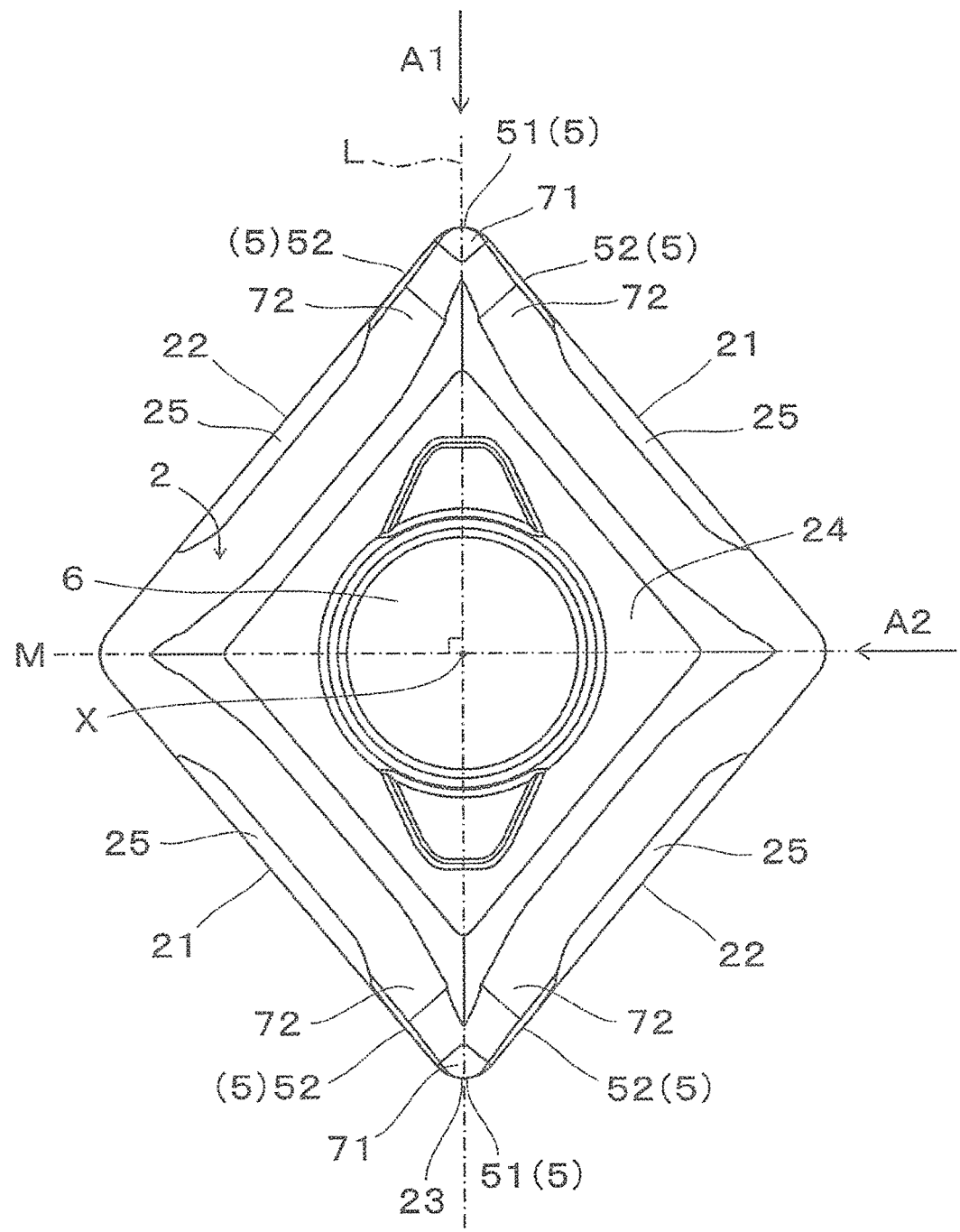
FIG. 2 is a top view of the cutting insert illustrated in FIG. 1.

In the present non-limiting aspect of the disclosure, because the upper surface 2 has the rhombus shape, the side surface 4 includes four side surfaces 41 having an approximately rectangular shape. A shape of the lower surface 3 when the lower surface 3 is viewed from above (viewed from bottom) is approximately the same as the shape of the upper surface 2. The upper surface 2 and the lower surface 3 are therefore overlapped with each other in a top view as illustrated in FIG. 2. Accordingly, the four side surfaces 41 located between the upper surface 2 and the lower surface 3 are respectively located vertically to the upper surface 2 and the lower surface 3. Thus, the insert 1 has a polygonal plate shape, specifically, a quadrangular plate shape including the upper surface 2, the lower surface 3, and the side surface 4 described above.

The cutting edges 5 are respectively formed at an intersecting part of the upper surface 2 and the side surface 4, and an intersection part of the lower surface 3 and the side surface 4. The insert 1 of the present non-limiting aspect of the disclosure is a so-called negative-type insert 1 in which the cutting edge 5 is also formed at the intersecting part of the lower surface 3 and the side surface 4 besides the intersecting part of the upper surface 2 and the side surface 4.

Alternatively, the insert 1 may be a so-called positive-type insert 1 in which the cutting edge 5 is formed only at the intersecting part of the upper surface 2 and the side surface 4.

The insert 1 of the present non-limiting aspect of the disclosure is of negative type, and the lower surface 3 has the same configuration as the upper surface 2 as described above even though not particularly illustrated. The negative-type insert 1 is therefore usable by being turned upside down. Specifically, as described later, when the lower surface 3 of the insert 1 is attached as a seating surface to the holder 103, the cutting edge 5 formed at the intersecting part of the upper surface 2 and the side surface 4 of the insert 1 is usable in a cutting process. When the upper surface 2 of the insert 1 is attached as a seating surface to the holder 103 by turning the insert 1 upside down, the cutting edge 5 formed at the intersecting part of the lower surface 3 and the side surface 4 of the insert 1 is usable in a cutting process.

The insert 1 of the present non-limiting aspect of the disclosure is designed to be fixed through a clamp member 107 to the holder 103 of the cutting tool 101 as described later. Specifically, the insert 1 includes the through hole 6 extending between a center of the upper surface 2 and a center of the lower surface 3. A front end part of the clamp member 107 for clamp fixing is inserted into the through hole 6. Upon screwing a screw 105 for fixing the clamp member 107 into the holder 3, the front end part of the clamp member 107 presses the insert 1 against the holder 103, and the insert 1 is fixed to the holder 103. As a method of fixing the insert 1 to the holder 103, other method, such as fixing by means of screwing, may be employed instead of the method using the above clamp structure.

A central axis X of the through hole 6 coincides with an imaginary straight line passing through the center of the upper surface 2 and the center of the lower surface 3 in the present non-limiting aspect of the disclosure. Therefore, the central axis X of the through hole 6 may be replaced with a central axis of the insert 1. The central axis of the insert 1 denotes an axis which extends between the upper surface 2 and the lower surface 3, and which serves as a rotation axis when the insert 1 is rotated in a top view.

In the insert 1 of the present non-limiting aspect of the disclosure, a width in a longitudinal direction and a width in a lateral direction on the upper surface 2 having the rhombus shape are settable according to conditions for a cutting process. A thickness of the insert 1 may be set according to the conditions for the cutting process. The term "thickness" denotes a distance in a vertical direction from a part of the upper surface 2 which is located uppermost to a part of the lower surface 3 which is located lowermost in a side view of the insert 1. The term "side view" denotes a state in which the insert 1 is viewed toward the side surface 4. The term "vertical direction" denotes a direction along the central axis X of the through hole 6. When a direction from the inside of the insert 1 toward the upper surface 2 is a positive direction, and a direction from the inside of the insert 1 toward the lower surface 3 is a negative direction, a positive side in the direction along the central axis X is upside, and a negative side in the direction along the central axis X is downside.

Figure 5:
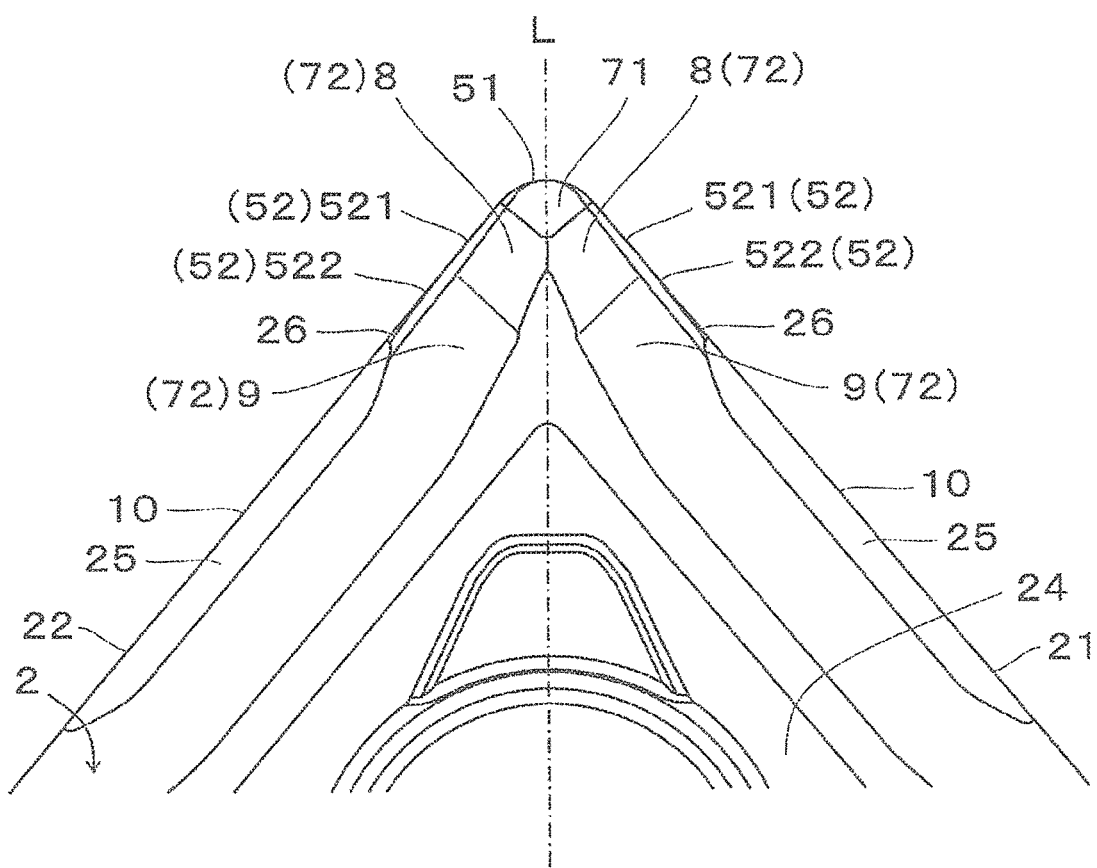
FIG. 5 is a partially enlarged view of FIG. 2.

The cutting edge 5 of the insert 1 in the present non-limiting aspect of the disclosure includes a first cutting edge 51 and a second cutting edge 52. The first cutting edge 51 is located at the corner part 23. The second cutting edge 52 is adjacent to the first cutting edge 51 and located at the first side part 21. Specifically, as illustrated in FIGS. 1, 2 and 5, the first cutting edge 51 is a cutting edge corresponding to the corner part 23, more specifically, the cutting edge located at an intersecting part of the corner part 23 of the upper surface 2 and the side surface 41. The second cutting edge 52 is a cutting edge corresponding to the first side part 21, more specifically, the cutting edge located at an intersecting part of the first side part 21 of the upper surface 2 and the side surface 41. The second cutting edge 52 is adjacent to the first cutting edge 51. In the present non-limiting aspect of the disclosure, the first cutting edge 51 has an outwardly protruding curvilinear shape and the second cutting edge 52 has a straight line shape in a top view.

As illustrated in FIG. 2, the upper surface 2 has the rhombus shape, the corner part 23 is located at an acute angle part having a rhombus shape, and the first side part 21 and the second side part 22 form the acute angle part in the present non-limiting aspect of the disclosure. The first cutting edge 51 is disposed correspondingly to the corner part 23, and the second cutting edge 52 is disposed correspondingly to the first side part 21. Because the upper surface 2 has the rhombus shape, the insert 1 is symmetrical relative to a bisector L of the corner part 23, and is also symmetrical relative to a straight line M which is vertical to the bisector L and passes through the central axis X. Accordingly, the cutting edge 5 of the insert 1 includes, on a side of the upper surface 2, two first cutting edges 51 and four second cutting edges 52 as illustrated in FIG. 2. The insert 1 is therefore a so-called two-cornered insert and applicable to a mirror image machining. Because the upper surface 2 has the same shape as the lower surface 3 as described above in the present non-limiting aspect of the disclosure, the insert 1 also includes, on a side of the lower surface 3, two first cutting edges 51 and four second cutting edges 52. Of course, the cutting edge 5 may include at least one first cutting edge 51 and at least one second cutting edge 52 irrespective of the configuration of the present non-limiting aspects of the disclosure.

Figure 3:
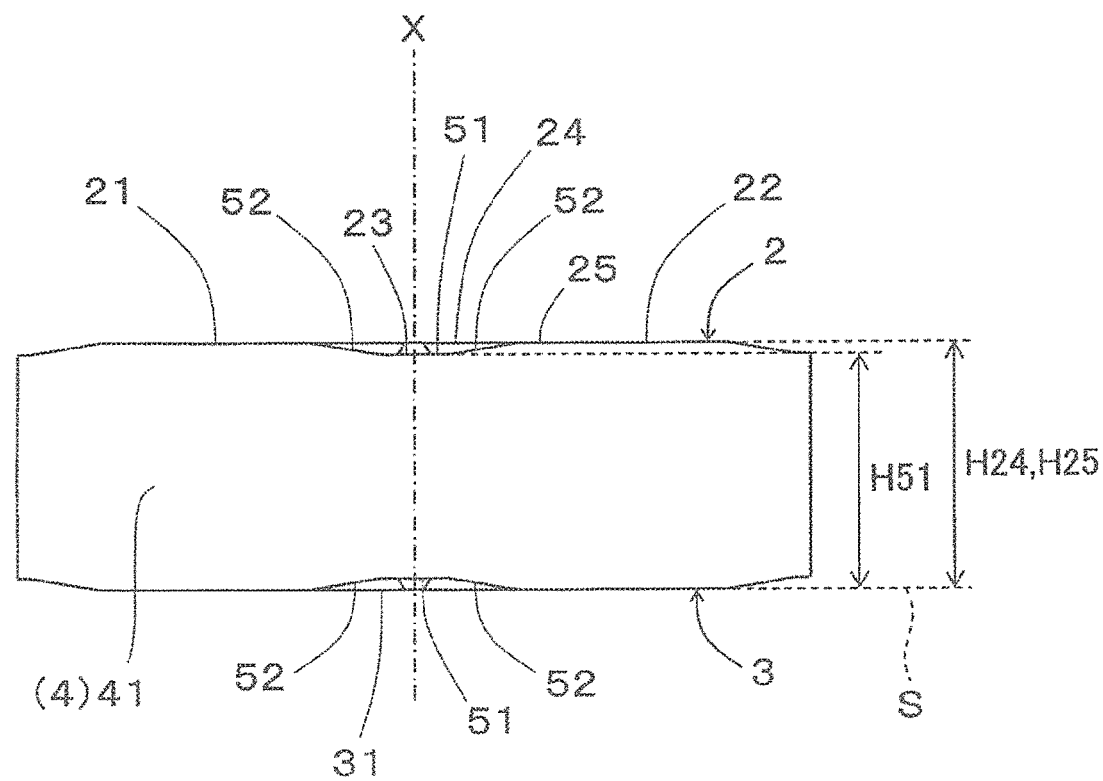
FIG. 3 is a side view of the cutting insert illustrated in FIG. 1, taken from A1 direction.
Figure 4:
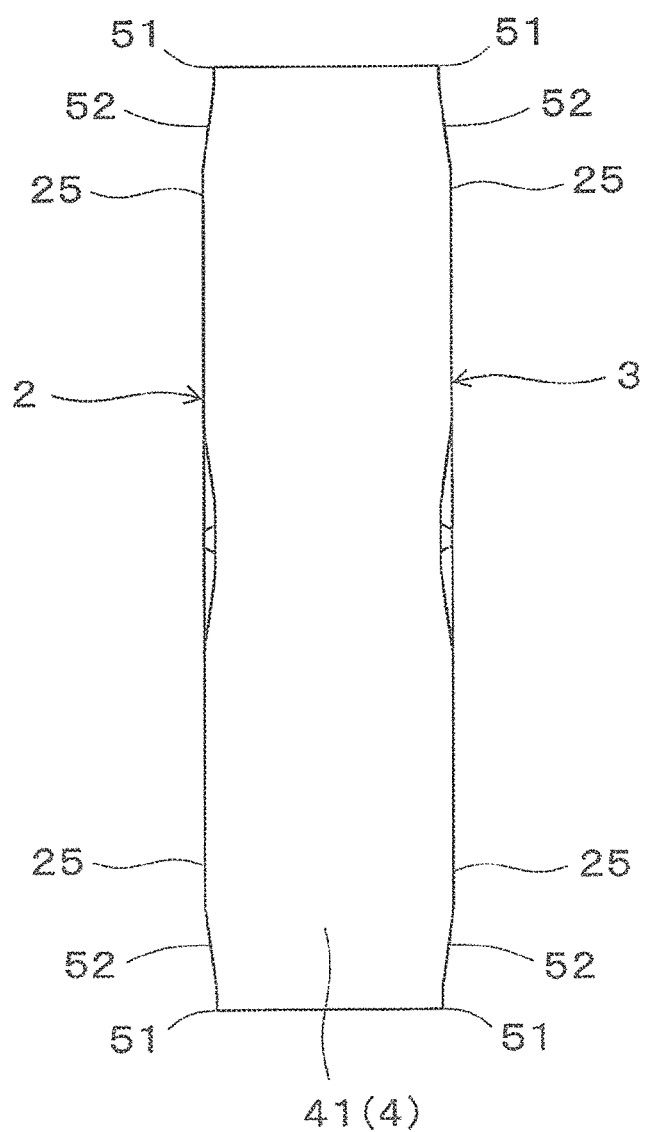
FIG. 4 is a side view of the cutting insert illustrated in FIG. 1, taken from A2 direction.

As illustrated in FIG. 3, a height H51 of the first cutting edge 51 relative to the lower surface 3 is constant in the present non-limiting aspect of the disclosure. The second cutting edge 52 is inclined so as to stay farther from the lower surface 3 as going farther from the corner part 23. For example, the second cutting edge 52 located on a side of the upper surface 2 is inclined upward as going farther from the corner part 23 when the insert 1 is kept still with the lower surface 3 facing down as illustrated in FIG. 3.

Each of the first cutting edge 51 and the second cutting edge 52 is designed to have a height from the lower surface 3 as described above in the present non-limiting aspect of the disclosure. That is, in the insert 1 of the present non-limiting aspect of the disclosure, because the height of a cutting edge part corresponding to the corner part 23 (the first cutting edge 51) from the lower surface 3 is kept constant over the entire length thereof, thrust force is much less likely to increase. Additionally, because a cutting edge part corresponding to the first side part 21 (the second cutting edge 52) is inclined so as to stay away from the lower surface 3, the primary boundary damage is much less likely to occur. The insert 1 is consequently capable of achieving good cutting performance even during machining under severe cutting conditions, for example, machining of difficult-to-cut materials, such as super heat resistant alloys.

The phrase that "the height H51 of the first cutting edge 51 relative to the lower surface 3 is constant" denotes that the height of the first cutting edge 51 from the lower surface 3 is constant. Here, the height from the lower surface 3 denotes a height from a plane S vertical to the central axis X of the through hole 6, including a lower end in the lower surface 3. More specifically, the plane S includes a lower end surface 31 of the lower surface 3 which corresponds to an upper end surface in the upper surface 2 (a first part 24 described later) in the insert 1 of the present non-limiting aspect of the disclosure. A dimension from the plane S to an evaluation target portion in the direction along the central axis X corresponds to a height from the lower surface 3.

The phrase that "the height H51 of the first cutting edge 51 is constant" does not need to be strictly constant. The height H51 of the first cutting edge 51 may be substantially constant. For example, the phrase that "the height of the first cutting edge 51 is constant" includes cases where the height H51 of the first cutting edge 51 has variations in a range of 5-8% of a dimension in the thickness direction of the insert 1 over the entire length of the first cutting edge 51. For example, when the thickness of the insert 1 is d1, the height H51 of the first cutting edge 51 is 0.90-0.95 d1 mm.

The phrase that "the second cutting edge 52 is inclined so as to stay farther from the lower surface 3 as going farther from the corner part 23" denotes that a height of the second cutting 52 from the lower surface 3 increases as going farther from the corner part 23. Although the second cutting edge 52 is inclined over the entire length of the second cutting edge 52 in the present non-limiting aspect of the disclosure, at least a part of the second cutting edge 52 may be inclined so as to stay farther from the lower surface 3 while maintaining a relationship that the height of the second cutting edge 52 is equal to or greater than the height of the first cutting edge 51. That is, for example, a region in which the height from the lower surface 3 is kept constant may be present in any portion of the second cutting edge 52. Although an inclination angle of the second cutting edge 52 is constant over the entire length of the second cutting edge 52 in the present non-limiting aspect of the disclosure, there is no intention to limit thereto. For example, the inclination angle of the second cutting edge 52 may vary. However, when the inclination angle of the second cutting edge 52 is constant over the entire length of the second cutting edge 52, it is possible to obtain the effect of reducing primary boundary damage and the effect of keeping a constant cutting resistance exerted on the second cutting edge 52, which are obtainable from the inclination of the second cutting edge 52 irrespective of a cut-out thickness. Hence, good cutting performance is achievable under a wide range of cutting conditions. For example, when d2 is the height H51 of the first cutting edge 51 which is a cutting edge height, the height of the second cutting edge 52 is, for example, 1.0-1.1 d2 mm. The inclination angle of the second cutting edge 52 relative to the lower surface 3 may be, for example, 2-7 degrees. In this case, the effect of reducing primary boundary damage is well compatible with the effect of reducing excessive thrust force.

The second cutting edge 52 may connect to the first cutting edge 51. When satisfying this configuration, the inclined second cutting edge 52 is disposed on a portion of the first side part 21 which includes a boundary portion between the first side part 21 and the corner part 23. The boundary portion is susceptible to primary boundary damage. Therefore, the effect of reducing primary boundary damage is suitably achievable.

Alternatively, a different cutting edge may be located between the first cutting edge 51 and the second cutting edge 52 in so far as individual functions of the first cutting edge 51 and the second cutting edge 52 are carried out. A height of the different cutting edge from the lower surface 3 may be equal to or greater than the height H51 of the first cutting edge 51 and equal to or smaller than the height of the second cutting edge 52.

Figure 8:
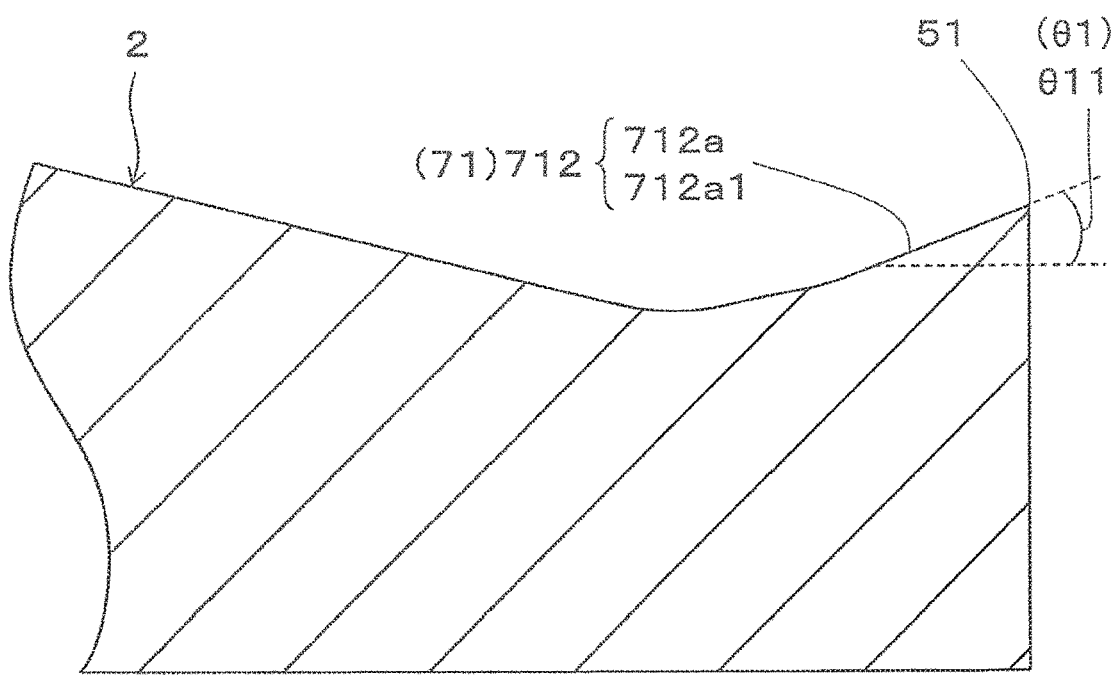
FIG. 8 is an enlarged view of a main part in a cross section taken along line A1-A1 in the cutting insert illustrated in FIG. 7.
Figure 9:
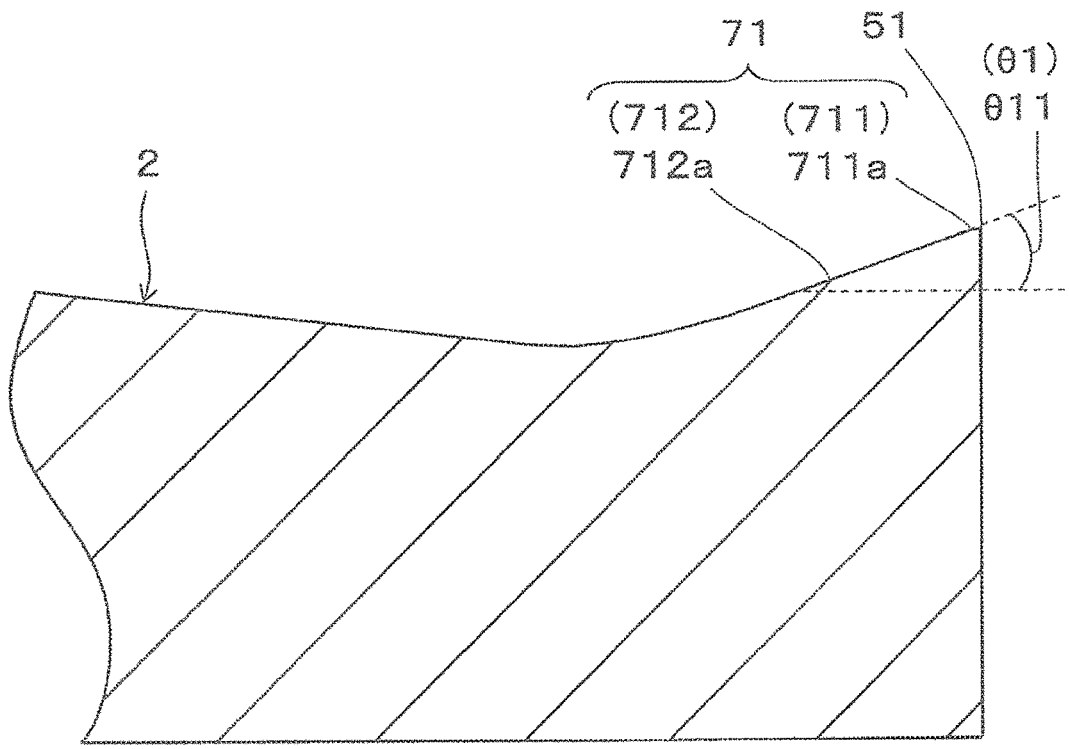
FIG. 9 is an enlarged view of a main part in a cross section taken along line A2-A2 in the cutting insert illustrated in FIG. 7.
Figure 10:
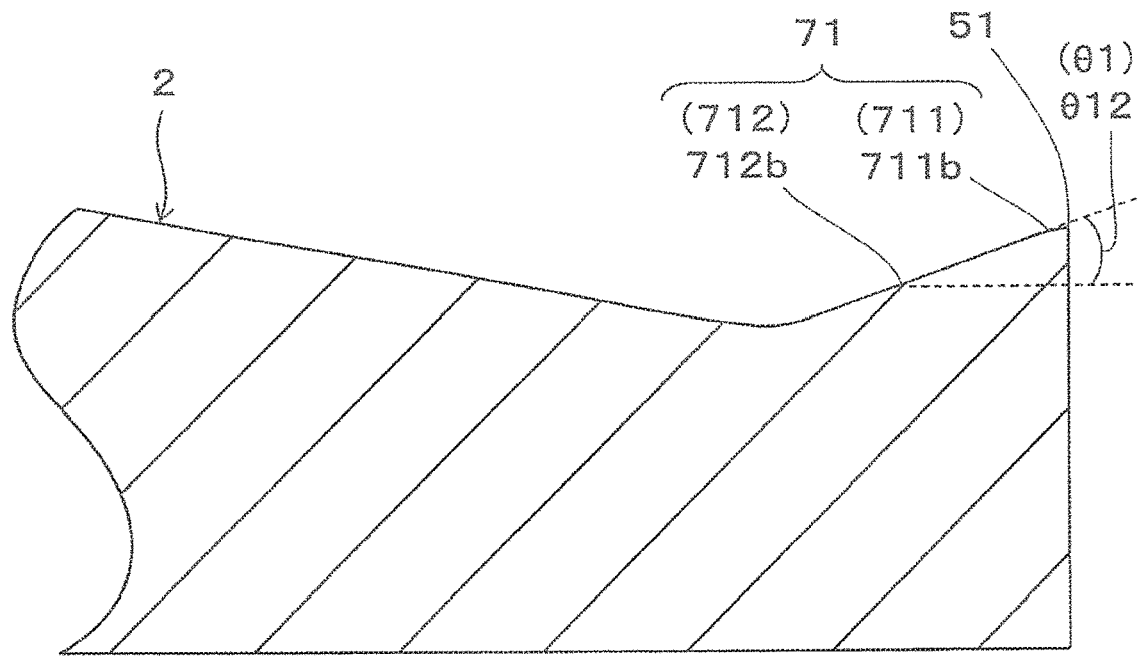
FIG. 10 is an enlarged view of a main part in a cross section taken along line A3-A3 in the cutting insert illustrated in FIG. 7.
Figure 11:
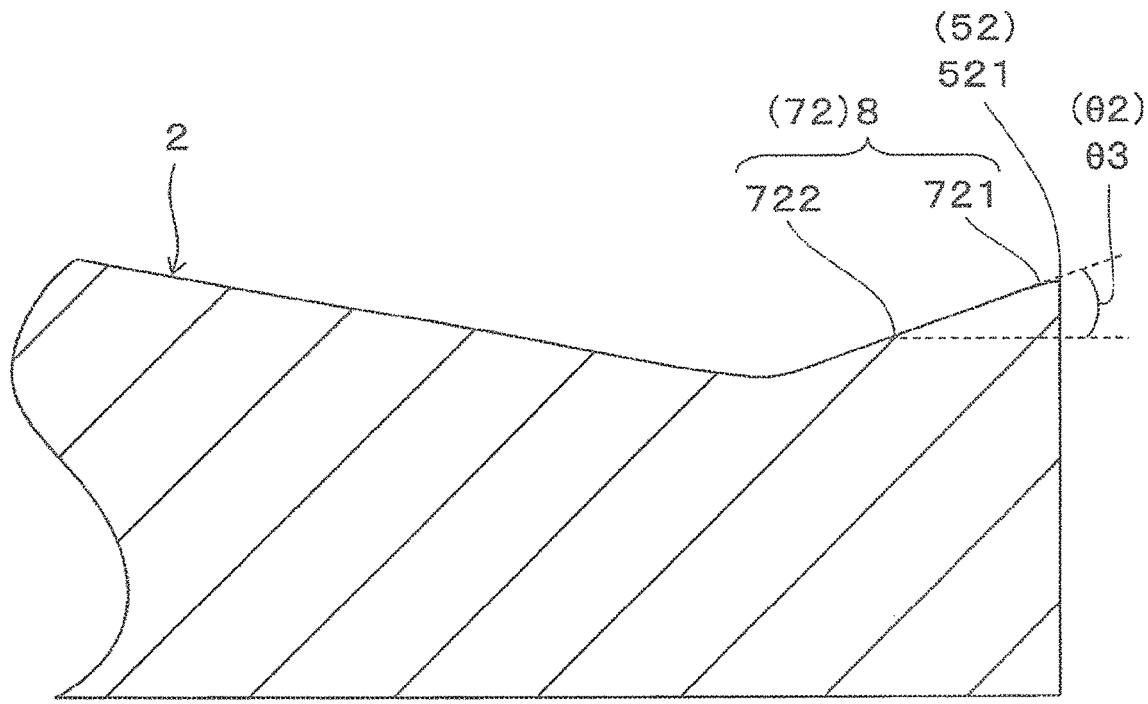
FIG. 11 is an enlarged view of a main part in a cross section taken along line B-B in the cutting insert illustrated in FIG. 7.
Figure 12:
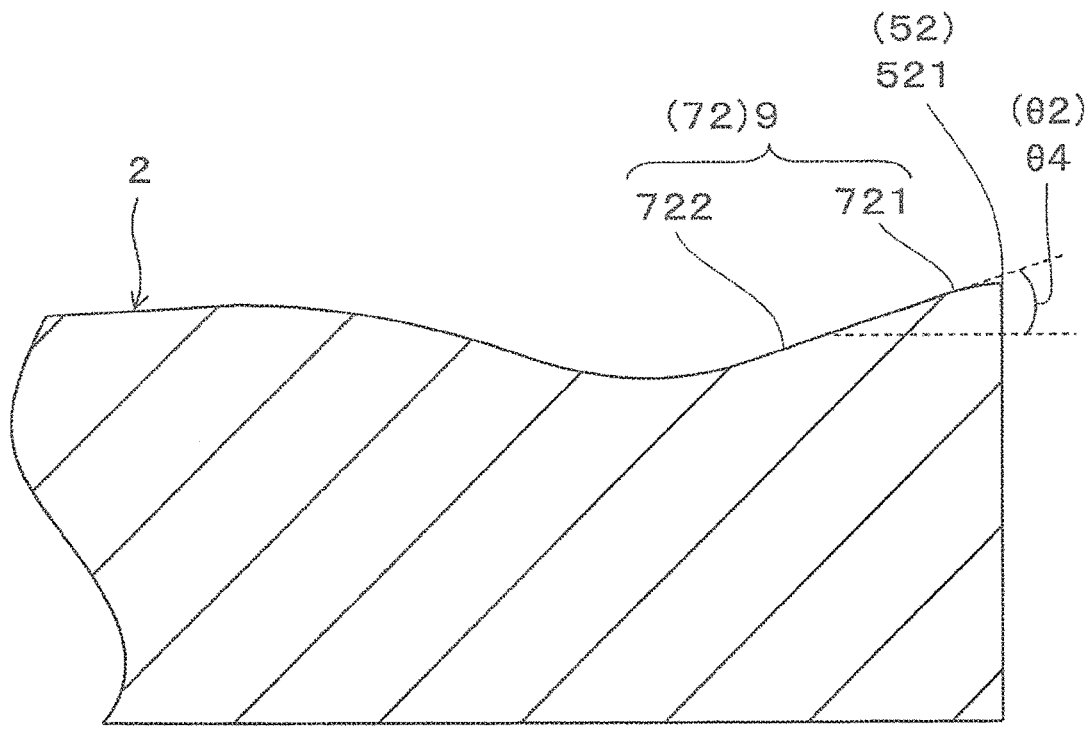
FIG. 12 is an enlarged view of a main part in a cross section taken along line C-C in the cutting insert illustrated in FIG. 7.
Figure 13:
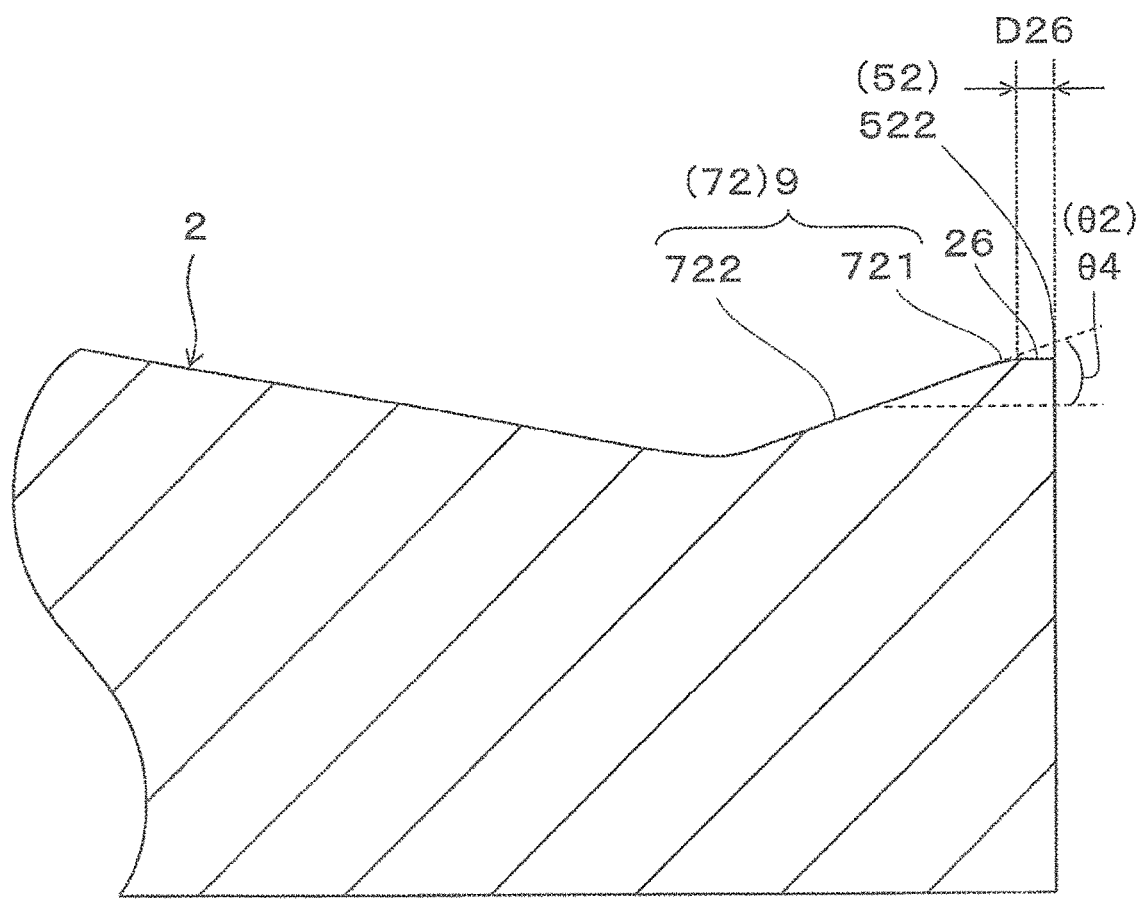
FIG. 13 is an enlarged view of a main part in a cross section taken along line D-D in the cutting insert illustrated in FIG. 7.

The upper surface 2 of the insert 1 in the present non-limiting aspect of the disclosure may include a first surface 71 and a second surface 72 as illustrated in FIGS. 1, 2, and 5. The first surface 71 is located along the first cutting edge 51, and the second surface 72 is located along the second cutting edge 52. The first surface 71 is inclined toward the lower surface 3 as going farther from the first cutting edge 51 as illustrated in FIGS. 8 to 10. The second surface 72 is inclined toward the lower surface 3 as going farther from the second cutting edge 52 as illustrated in FIGS. 11 to 13. Each of the first surface 71 and the second surface 72 is a surface along which chips generated by the corresponding cutting edge 5 pass through, namely, the surface that functions as a rake surface.

As illustrated in FIGS. 9 and 10, the first surface 71 includes a first surface portion 711 (first protruding curved surface portion) which is located along the first cutting edge 51 and has a curved surface shape protruding upward. The second surface 72 includes a second surface portion 721 (second protruding curved surface portion) which is located along the second cutting edge 52 and has a curved surface shape protruding upward.

More specifically, as illustrated in FIGS. 9 and 10, the first surface 71 includes the first surface portion 711 located at a front end side (outward side), and a first flat surface portion 712 located inside (inward side) of the first surface portion 711. The first flat surface portion 712 is inclined toward the lower surface 3 as going farther from the first surface portion 711 (first cutting edge 51). Thus, the first cutting edge 51 connects to the first flat surface portion 712 with mainly the first surface portion 711 interposed therebetween. As illustrated in FIGS. 11 to 13, the second surface 72 includes the second surface portion 721 located at a front end side, and a second flat surface portion 722 located inside of the second surface portion 721. The second flat surface portion 722 is inclined toward the lower surface 3 as going farther from the second surface portion 721 (second cutting edge 52). Thus, the second cutting edge 52 connects to the second flat surface portion 722 with the second surface portion 721 interposed therebetween. Specifically, instead of configuring the surface that functions as the rake surface by two different flat surfaces, a narrow region located at a side of the cutting edge 5 is made into a protruding curved surface part, and a region located inward is made into a flat part in the present non-limiting aspect of the disclosure. This contributes to effectively enhancing the cutting edge subjected to a large load during a cutting process. This also contributes to maintaining a sharp cutting edge shape. Consequently, microfracture of the cutting edge due to attachment of an adhered material to the cutting edge or peeling off of the adhered material is less likely to occur.

The term "outward" denotes a direction away from the central axis X, and the term "inward" denotes a direction approaching the central axis X. Alternatively, a region directly connecting to the first flat surface portion 712 without interposing the first surface portion 711 may be present in any portion of the first cutting edge 51.

A radius of curvature R2 of the second surface portion 721 is equal to or greater than a radius of curvature R1 of the first surface portion 711 in the present non-limiting aspect of the disclosure.

Accordingly, a portion corresponding to the first cutting edge 51 becomes sharp to further enhance the effect of reducing thrust force, and vibration is less likely to occur during machining. A portion corresponding to the second cutting edge 52 has enhanced cutting edge strength, and therefore, the second cutting edge 52 is less likely to be fractured. The cutting edge 5 is consequently less likely to be fractured while reducing the vibration during machining, thus leading to stable machining.

As illustrated in FIGS. 9 and 10, the first surface portion 711 may include a first portion 711a and a second portion 711b located closer to the second cutting edge 52 than the first portion 711a. Here, a radius of curvature R1 in the second portion 711b may be greater than a radius of curvature R1 in the first portion 711a. When satisfying these configurations, strength of a part of the first surface 71 along which chips generated by the first cutting edge 51 contactingly pass through, namely, a so-called primary boundary part can be enhanced on a side of the second cutting edge 52. It is therefore possible to enhance the effect of reducing the probability of primary boundary damage while maintaining the effect of reducing thrust force because of the constant cutting edge height. The term "primary boundary part" denotes a part of the cutting edge located in an advance direction of the cutting tool, specifically, a boundary part between a portion used for a cutting process (the portion being in contact with a workpiece) and a portion not used for the cutting process. In other words, the primary boundary part corresponds to the portion of the cutting edge located in the advance direction of the cutting tool which is in contact with an uppermost surface part of the workpiece. The uppermost surface part of the workpiece is significantly hardened due to manufacturing processes for the workpiece. Hence, the primary boundary part brought into contact with the uppermost surface part of the significantly hardened workpiece should have sufficient strength. An interior of the workpiece tends to adhere to the cutting edge because the interior of the workpiece is relatively soft in the absence of hardening due to the manufacturing processes. The first surface portion 711 or the second surface portion 721 is located on the primary boundary part having the above property in the present non-limiting aspect of the disclosure. Specifically, a position of an inward end of the first surface portion 711 and a position of an inward end of the second surface portion 721 along the direction vertical to the cutting edge 5 in a top view are designed to be kept farther from the cutting edge 5 as going farther from the first cutting edge 51. Thus, a cutting edge of the primary boundary part can be enhanced, and the primary boundary damage is much less likely to occur.

Alternatively, the radius of curvature R1 of the first surface portion 711 may increase as going farther from the bisector L of the corner part 23 in a top view. When satisfying this configuration, the strength of the so-called primary boundary part increases as going farther from the corner part 23. It is therefore possible to further enhance the effect of reducing the probability of primary boundary damage while maintaining the effect of reducing thrust force because of the constant cutting edge height. Still alternatively, the first surface portion 711 may include a region in which the radius of curvature R1 is constant, or the radius of curvature R1 of the first surface portion 711 may increase at a constant rate as going farther from the bisector L. When the radius of curvature R1 of the first surface portion 711 increases at the constant rate as going farther from the bisector L, irregularities is much less likely to occur in a region of the upper surface 2 which functions as a rake surface. This leads to a smooth discharge of chips.

The radius of curvature R1 of the first surface portion 711 on the bisector L of the corner part 23 is designed to reach zero in the present non-limiting aspect of the disclosure. In other words, as illustrated in FIG. 8, the first surface portion 711 is not present and the first cutting edge 51 directly connects to the first flat surface portion 712 without the first surface portion 711 interposed therebetween in a cross section passing through the bisector L of the corner part 23. In this regard, a description is given in detail in relation to the first region 712a of the first flat surface portion 712 described later.

The radii of curvature R1 and R2 of the first surface portion 711 and the second surface portion 721 denote radii of curvature of corresponding surface portions in a cross section vertical to the corresponding cutting edge 5 (51, 52) in a top view. Although the first cutting edge 51 in the present non-limiting aspect of the disclosure is the curvilinear cutting edge, in this case, a radius of curvature of the first surface portion 711 in a cross section vertical to a tangent line of the first cutting edge 51 is the radius of curvature R1 in a top view. Here, the radius of curvature R1 of the first surface portion 711 can be taken as a radius of curvature of an imaginary circular arc obtained by connecting a front end of the first flat surface portion 712 of the first surface 71 to the first cutting edge 51. When a land part is disposed along the cutting edge 5, the radius of curvature R1 of the first surface portion 711 can be taken as a radius of curvature of an imaginary circular arc obtained by connecting the front end of the first flat surface portion 712 of the first surface 71 to a rear end of the land part along the first cutting edge 51. These are also true for the radius of curvature R2 of the second surface portion 721. The radius of curvature R1 is, for example, 0-1.5 mm. The radius of curvature R2 is, for example, 0.3-3.0 mm.

As illustrated in FIGS. 8 to 13, an inclination angle θ1 of the first flat surface portion 712 relative to the lower surface 3 may be greater than an inclination angle θ2 of the second flat surface portion 722 relative to the lower surface 3 in the present non-limiting aspect of the disclosure. In other words, the inclination angle θ1 of the first surface 71 relative to the lower surface 3 may be greater than the inclination angle θ2 of the second surface 72 relative to the lower surface 3. Here, the inclination angle θ1 of the first surface 71 is a so-called rake angle of the first surface 71. The inclination angle θ2 of the second surface 72 is a so-called rake angle of the second surface 72. More specifically, the inclination angle θ1 is an angle formed by the first flat surface portion 712 of the first surface 71 and the lower surface 3, and the inclination angle θ2 is an angle formed by the second flat surface portion 722 of the second surface 72 and the lower surface 3.

Thus, the inclination angle θ1 and the inclination angle θ2 may be designed to be θ1>θ2 in the present non-limiting aspect of the disclosure. When satisfying this configuration, it is possible to reduce frictional force between chips and the first surface 71 on the first surface 71 which is susceptible to rake surface wear, namely, crater wear due to grazing of chips. It is also possible to ensure cutting edge strength in the second surface 72. Consequently, the crater wear and fracture of the cutting edge are less likely to occur. The inclination angle θ1 is, for example, 15-27 degrees. The inclination angle θ2 is, for example, 10-22 degrees.

As illustrated in FIGS. 8 to 10, the first flat surface portion 712 may include a first region 712a and a second region 712b located closer to the second cutting edge 52 than the first region 712a. An inclination angle θ1 in the second region 712b may be smaller than an inclination angle θ1 in the first region 712a. That is, θ11 in FIGS. 8 and 9 and θ12 in FIG. 10 may have a relationship of θ11>θ12. When satisfying these configurations, this enhances the effect of reducing the probability of the crater wear and the fracture of the cutting edge 5.

The inclination angle θ1 of the first flat surface portion 712 (first surface 71) may decrease as going farther from the bisector L of the corner part 23 in a top view in the present non-limiting aspect of the disclosure. When satisfying this configuration, this further enhances the effect of reducing the probability of the crater wear and the fracture of the cutting edge 5.

As illustrated in FIG. 8, a portion 712a1 of the first region 712a which is located on the bisector L of the corner part 23 may connect to the first cutting edge 51. When satisfying this configuration, a cutting edge portion of the corner part 23 in the first cutting edge 51 becomes a sharp edge, thereby enhancing the effect of reducing thrust force in the corner part 23 subjected to larger load. This leads to a further reduction of vibration during machining.

Figure 6:
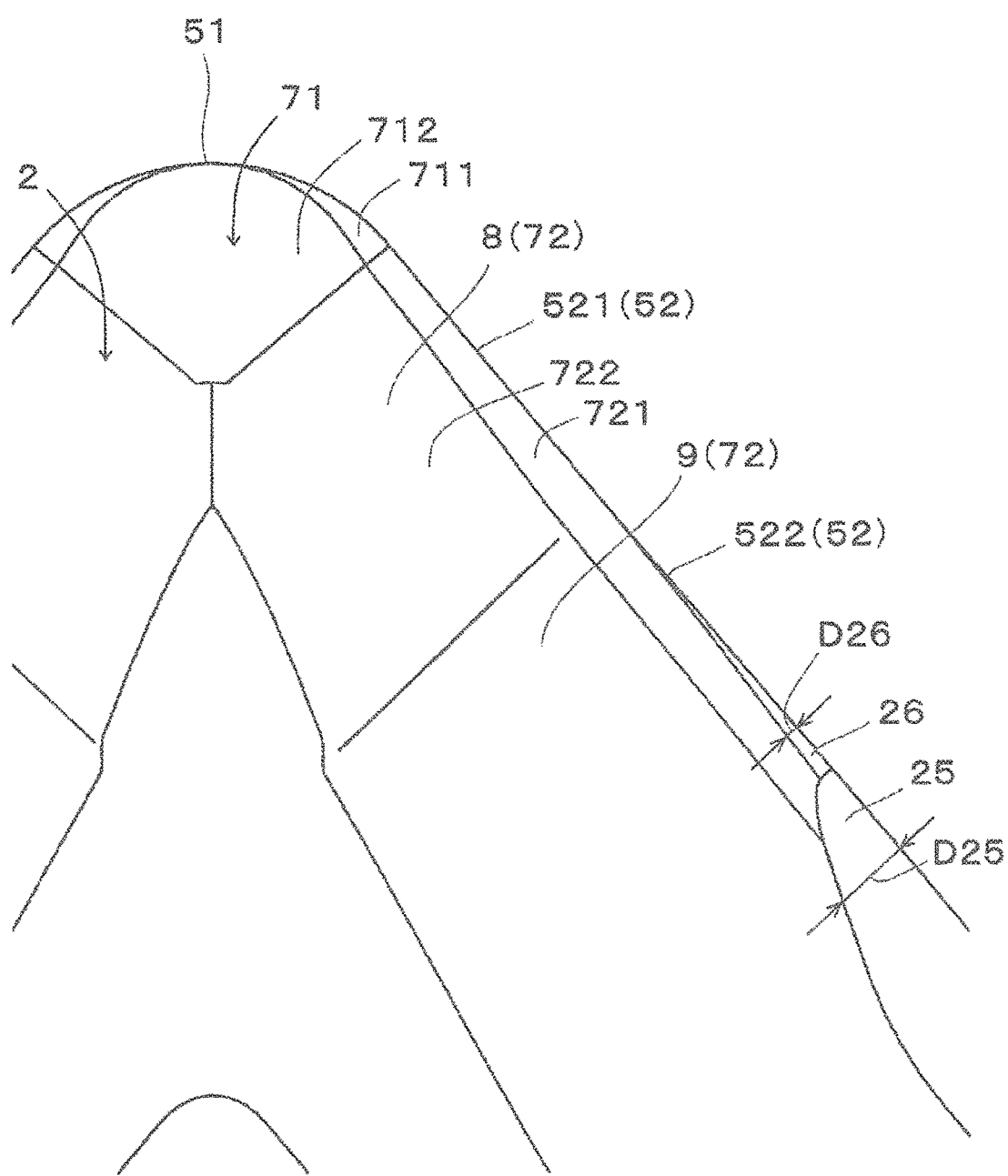
FIG. 6 is a partially enlarged view of FIG. 2.
Figure 7:
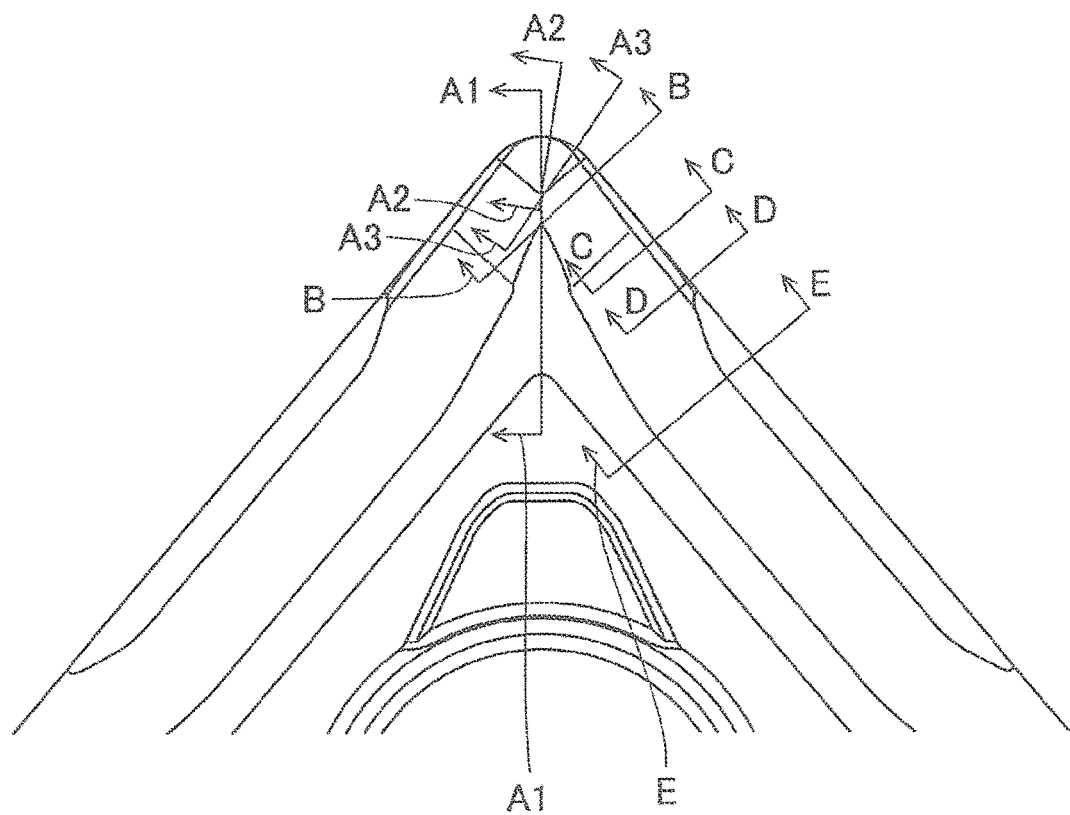
FIG. 7 is a diagram illustrating sectional positions respectively for sectional views of FIGS. 8 to 14 in the partially enlarged view of FIG. 2.

As illustrated in FIGS. 5 and 6, the second cutting edge 52 may include a third cutting edge 521 and a fourth cutting edge 522 in order from a side of the first cutting edge 51 in the present non-limiting aspect of the disclosure. Of the second cutting edge 52, the third cutting edge 521 is a cutting edge portion adjacent to the first cutting edge 51, and the fourth cutting edge 522 is a cutting edge portion adjacent to the third cutting edge 521. Further, the second surface 72 may include a third surface 8 and a fourth surface 9 in order from a side of the first surface 71. Of the second surface 72, the third surface 8 is a portion corresponding to the third cutting edge 521, and the fourth surface 9 is a portion corresponding to the fourth cutting edge 522. More specifically, the third surface 8 is a rake surface disposed along the third cutting edge 521, and the fourth surface 9 is a rake surface disposed along the fourth cutting edge 522.

The portion of the second surface 72 which corresponds to the third cutting edge 521, namely, the third surface 8 is designed as follows in the present non-limiting aspect of the disclosure. That is, a radius of curvature R3 of the second surface portion 721 of the third surface 8 is constant, and an inclination angle θ3 of the third surface 8 relative to the lower surface 3 decreases as going farther from the corner part 23 (refer to FIG. 11). This makes it possible to decrease a contact region between chips and the rake surface by raising chips generated by the first cutting edge 51 in a region of the third surface 8 which is located at a side of the fourth surface 9, namely, a region away from the corner part 23, while maintaining strength of the second surface portion 721. Consequently, generation of heat in the rake surface in the corner part 23, namely, the first surface 71 can be reduced while reducing the probability of primary boundary damage. It is therefore possible to reduce the probability of both primary boundary damage and crater wear. The radius of curvature R3 is, for example, 0.3-1.8 mm. The radius of curvature R3 may be substantially constant and, for example, the values of the radius of curvature R3 may have a difference of ±0.2 mm. The inclination angle θ3 is, for example, 15-20 degrees.

The third surface 8 may include a region in which the inclination angle θ3 is constant. Alternatively, the inclination angle θ3 of the third surface 8 may decrease at a constant rate as going farther from the corner part 23. When the inclination angle θ3 of the third surface 8 decreases at the constant rate as going farther from the corner part 23, irregularities is much less likely to occur in a region of the upper surface 2 which functions as a rake surface. This leads to a smooth discharge of chips.

A portion of the second surface 72 which corresponds to the fourth cutting edge 522, namely, the fourth surface 9 is designed as follows in the present non-limiting aspect of the disclosure. That is, a radius of curvature R4 of the second surface portion 721 of the fourth surface 9 increases as going farther from the corner part 23, and an inclination angle θ4 of the fourth surface 9 relative to the lower surface 3 is constant (refer to FIGS. 12 and 13). Accordingly, strength of the primary boundary part can be enhanced as going farther from the corner part 23, and space can be left between the cutting edge 5 and generated chips. Consequently, the effect of reducing the probability of primary boundary damage and the chip discharge performance can be further enhanced. The radius of curvature R4 is, for example, 0.5-3.0 mm. The inclination angle θ4 is, for example, 15-20 degrees. The inclination angle θ4 may be substantially constant and, for example, the values of the inclination angle θ4 may have a difference of ±1 degree.

The fourth surface 9 may include a region in which the radius of curvature R4 is constant. Alternatively, the radius of curvature R4 of the fourth surface 9 may increase at a constant rate as going farther from the corner part 23. When the radius of curvature R4 of the fourth surface 9 increases at the constant rate as going farther from the corner part 23, irregularities is much less likely to occur in the region of the upper surface 2 which functions as a rake surface. This leads to a smooth discharge of chips.

With the present non-limiting aspects of the disclosure in which the second surface 72 includes the third surface 8 along the third cutting edge 521 and the fourth surface 9 along the fourth cutting edge 522, two surface regions having a difference in height are disposed along the second cutting edge 52. Generated chips can therefore be raised by the difference in height. This contributes to decreasing a contact region between the chips and the rake surface, thereby reducing crater wear.

Figure 14:
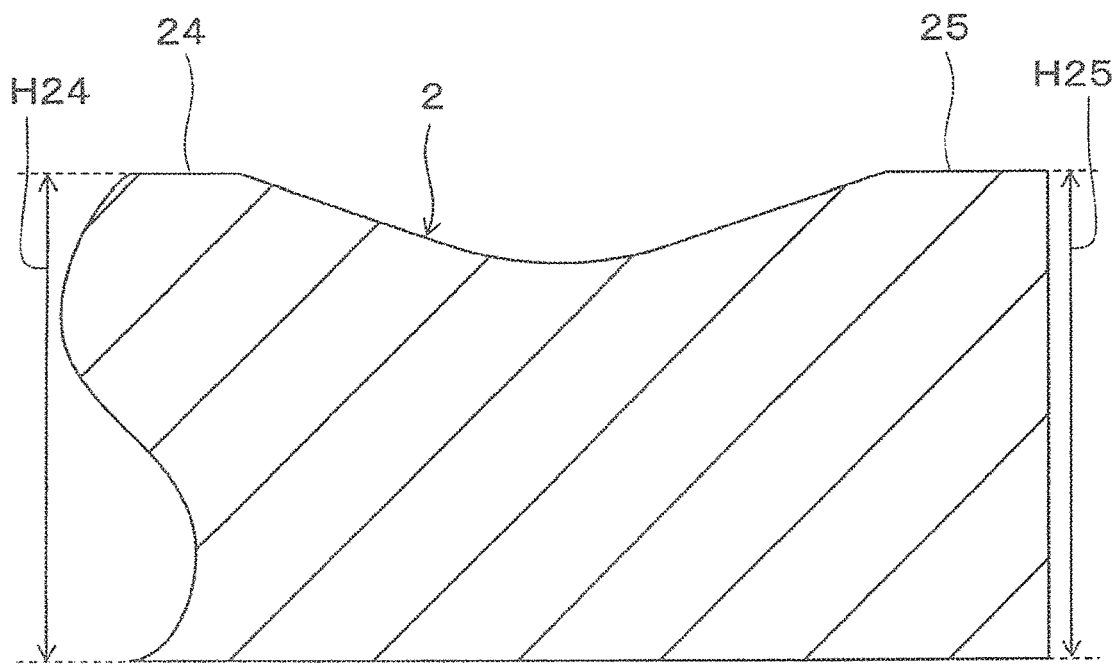
FIG. 14 is an enlarged view of a main part in a cross section taken along line E-E in the cutting insert illustrated in FIG. 7.

As illustrated in FIGS. 1, 2, and 5, the upper surface 2 may further include a first part 24 and a second part 25. The first part 24 is located at a central part of the upper surface 2, and a height H24 relative to the lower surface 3 is kept constant as illustrated in FIGS. 3 and 14. That is, the first part 24 is a flat surface located at a central part of the upper surface 2. The second part 25 extends from a portion 10 of an intersecting part of the upper surface 2 and the side surface 4 which is located adjacent to the fourth cutting edge 522, toward the central part of the upper surface 2 as illustrated in FIG. 5. That is, the second part 25 extends from a portion of the first side part 21 which is located at a rear end side of the second cutting edge 52 (a side departing from the corner part 23) toward the central part of the upper surface 2 in a top view. As illustrated in FIGS. 3 and 14, a height H25 of the second part 25 relative to the lower surface 3 is also constant and equal to the height H24 of the first part 24 relative to the lower surface 3.

With the insert 1 of the present non-limiting aspects of the disclosure including the first part 24 and the second part 25 described above, the first part 24 and the second part 25 are capable of functioning as a seating surface when the insert 1 is attached to the holder 103. This leads to a stable attachment of the insert 1 to the holder 103. Because space left between the seating surface of the insert 1 and the holder 103 becomes small, the cutting edge 5 on a side of the seating surface of the insert 1 is less likely to be damaged due to chips entered the space. The height H24 is, for example, 2-10 mm that is equal to a thickness d1 of the insert 1. The height H25 is, for example, 2-10 mm that is equal to the thickness d1 of the insert 1. The heights H24 and H25 may be substantially constant and, for example, values of each of the heights H24 and H25 may have a difference of ±0.5 mm.

The upper surface 2 of the insert 1 has the rhombus shape symmetrical relative to the bisector L of the corner part 23 as described above (refer to FIG. 2) in the present non-limiting aspect of the disclosure. Accordingly, configurations similar to those of the cutting edge part (the second cutting edge 52), the rake surface (the second surface 72), and the second part 25, which are disposed correspondingly to the first side part 21, are also disposed correspondingly to the second side part 22. Specifically, the cutting edge 5 having the same configuration as the second cutting edge 52 is disposed on a portion of the intersecting part of the upper surface 2 and the side surface 41 which corresponds to the second side part 22. A surface having the same configuration as the second surface 72 is disposed as a rake surface along the cutting edge 5 corresponding to the second side part 22. A flat part having the same configuration as the second part 25 is also disposed correspondingly to the second side part 22.

Thus, the insert 1 includes the flat portions (the second part 25 and the flat part) on each of the first side part 21 and the second side part 22 which constitute the corner part 23. The insert 1 is therefore supported on the two side parts of the insert 1 in addition to the first part 24 by the holder 103 when the insert 1 is attached to the holder 103. This leads to a more stable attachment of the insert 1 to the holder 103. The cutting edge 5 on a side of the seating surface of the insert 1 is much less likely to be damaged due to chips.

As illustrated in FIGS. 5 and 6, the upper surface 2 may further include a third part 26 located between the fourth cutting edge 522 (the second cutting edge 52) and the fourth surface 9. The third part 26 is a so-called land part. The third part 26 connects to the second part 25 in a direction along the second cutting edge 52 in the present non-limiting aspect of the disclosure. That is, a rear end side of the third part 26 (a side departing from the corner part 23) connects to the second part 25. A length D26 of the third part 26 in a direction vertical to the second cutting edge 52 increases as approaching the second part 25 in a top view (refer to FIGS. 6 and 13). In other words, the length D26 of the third part 26 reaches a minimum on a side of the corner part 23 and reaches a maximum on a side of the second part 25. The third part 26 has a triangular shape in a top view in the present non-limiting aspect of the disclosure. Cutting edge strength can be further enhanced and good cutting performance is achievable even under more severe cutting conditions by including the third part 26 as described above. The third part 26 may be located along the entire length of the fourth cutting edge 522, or alternatively may be located along a part of the fourth cutting edge 522. When the third part 26 is located along a part of the fourth cutting edge 522 as in the present non-limiting aspect of the disclosure, an area of the second part 25 on a side of the corner part 23 can be increased while maintaining cutting performance on the side of the corner part 23. Hence, maintenance of cutting performance is compatible with good seating stability.

The third part 26 may be a flat surface. When satisfying this configuration, no sharp corner part is generated at a connection portion of the second part 25 and the second cutting edge 52, and the connection portion is less susceptible to unforeseeable fracture due to contact with chips.

As illustrated in FIG. 6, a length D25 of the second part 25 in a direction vertical to the intersecting part of the upper surface 2 and the side surface 4, and a length D26 of the third part 26 may have a relationship of D26<D25 in a top view. When satisfying this configuration, the effect of improving seating stability is suitably obtainable while maintaining the cutting performance of the cutting edge 5. When the length D26 of the third part 26 is smaller than the length of the second surface portion 721 in the direction vertical to the second cutting edge 52, space for discharging chips is less likely to decrease, thereby improving chip discharge performance.

The fourth cutting edge 522 may connect to the third cutting edge 521. When satisfying this configuration, the cutting edge strength is less likely to become excessively low or high. Good cutting performance is achievable under a wide range of cutting conditions. Alternatively, a different cutting edge may be located between the third cutting edge 521 and the fourth cutting edge 522 in so far as individual functions of the third cutting edge 521 and the fourth cutting edge 522 are carried out.

Although the upper surface 2 of the insert 1 in the present non-limiting aspect of the disclosure has the quadrangular shape, namely, the rhombus shape in a top view as illustrated in FIG. 2, there is no intention to limit to this configuration. For example, the shape of the upper surface 2 in a top view may be a polygonal shape, such as a triangular shape, a pentagonal shape, a hexagonal shape, or an octagonal shape.

The phrase that "the shape in a top view is the quadrangular shape" does not need to be strictly a quadrangular shape. A main part of an outer edge of the upper surface 2 may be designed to have four sides and, for example, the corner part 23 may partially have a curvilinear shape.

<Cutting Tool>

The cutting tool in a non-limiting aspect of the present disclosure is described below with reference to the drawings.

Figure 15:
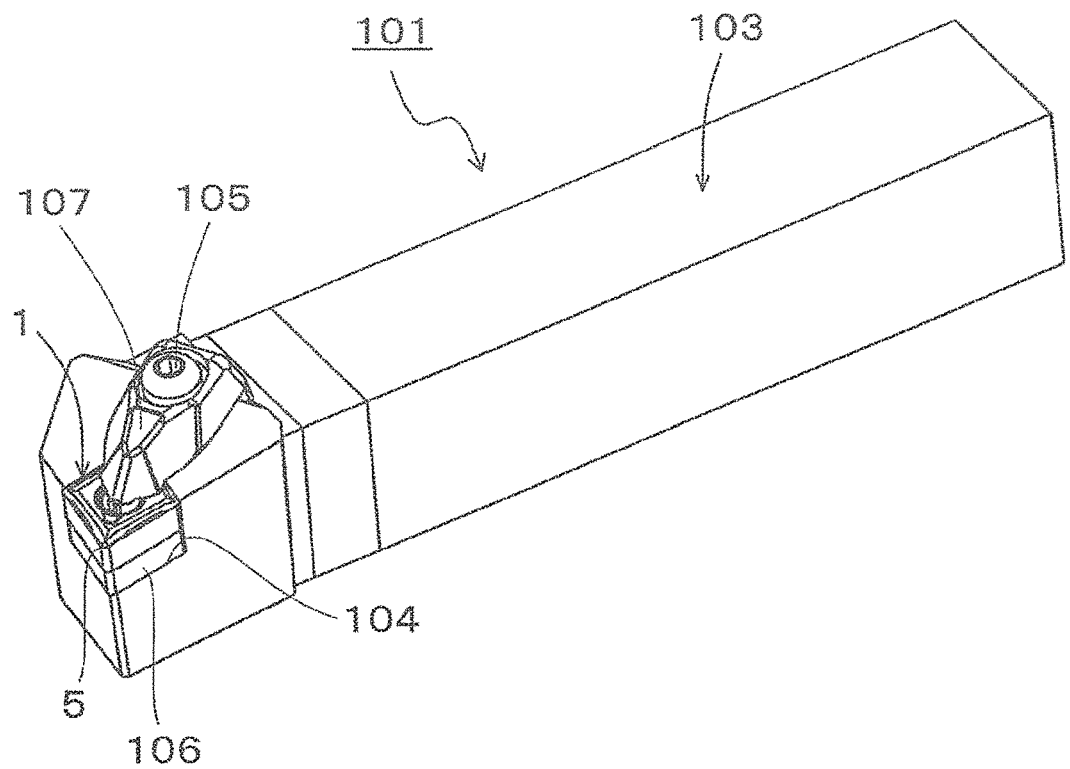
FIG. 15 is a perspective view illustrating a cutting tool in a non-limiting aspect of the present disclosure.

As illustrated in FIG. 15, the cutting tool 101 of the present non-limiting aspect of the disclosure includes the insert 1 represented by the above non-limiting aspect of the disclosure, and the holder 103 designed to attach the insert 1 thereto. The holder 103 in the present non-limiting aspect of the disclosure has a bar shape whose one end part includes an insert pocket 104 that permits attachment of the insert 1. The insert 1 is attached to the holder 103 so that the cutting edge 5 protrudes outward from an outer periphery of the holder 103.

The insert 1 is fixed to the insert pocket 104 by a clamp member 107 in the present non-limiting aspect of the disclosure. Specifically, a screw 105 is inserted into a through hole of the clamp member 107 in a state in which a tip of the clamp member 107 is inserted into the through hole 6 of the insert 1. Screw parts are engaged with each other by inserting a tip of the screw 105 into a screw hole (not illustrated) formed in the holder 103, so that the tip of the clamp member 107 presses the insert 1 against the holder 103. Thus, the insert 1 is attachable to the holder 103.

A sheet member 106 is disposed between the insert pocket 104 and the insert 1 in the present non-limiting aspect of the disclosure. The insert 1 is therefore less likely to be fractured or the like. For example, steel or cast iron is usable as material of the holder 103. Of these materials, steel with high rigidity may be used.

Because the cutting tool 101 in the present non-limiting aspect of the disclosure includes the insert 1 having the above characteristic configurations, it is possible to reducing the probability of primary boundary damage while suitably reducing an increase in thrust force. It is consequently possible to provide good cutting performance over a long period of time even in machining under severe cutting conditions, for example, machining a difficult-to-cut material, such as super heat resistant alloys.

<Method of Manufacturing Machined Product>

A method of manufacturing a machined product in a non-limiting aspect of the present disclosure is described below with reference to the drawings.

Figure 16:
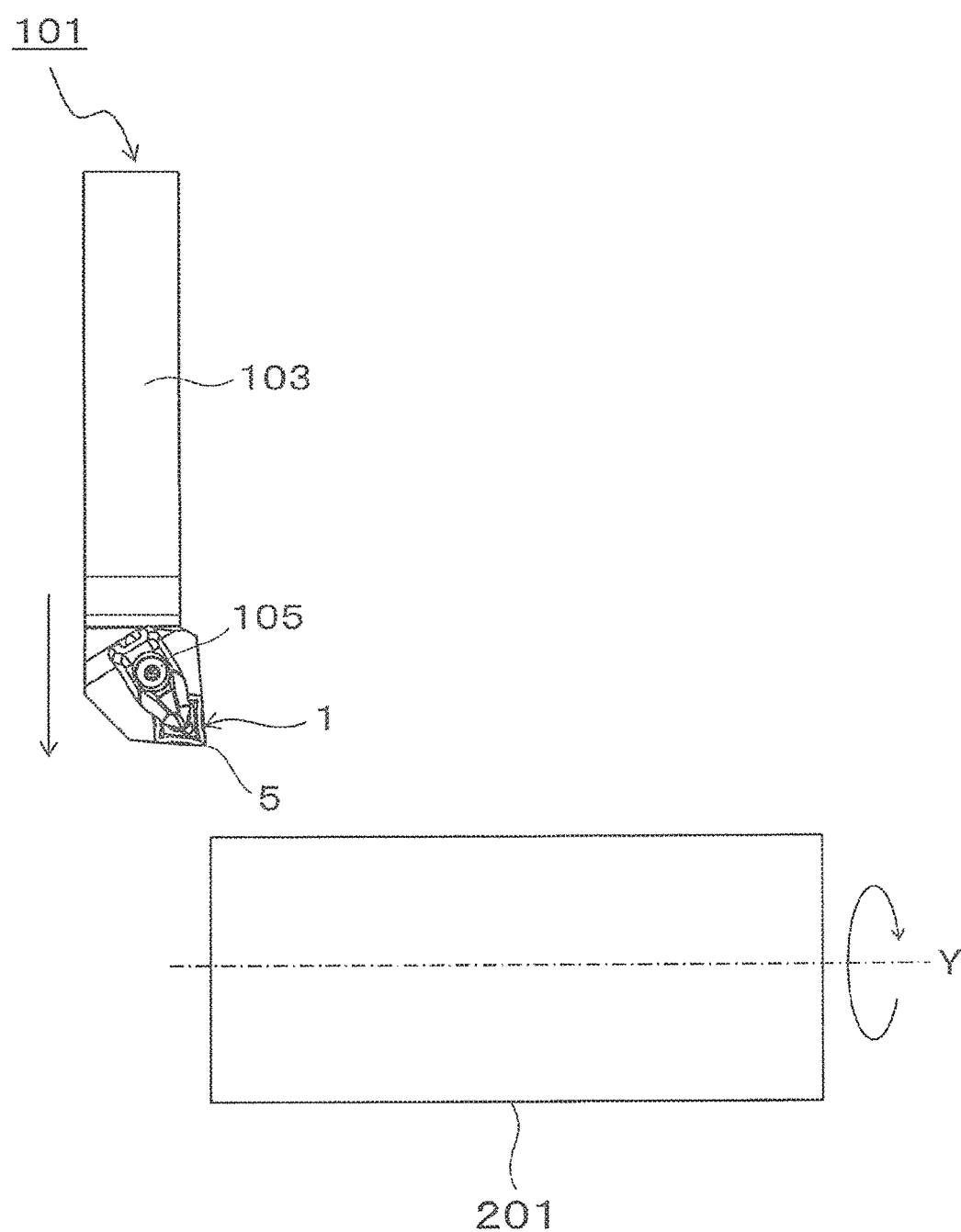
FIG. 16 is a schematic diagram illustrating a step in a method of manufacturing a machined product in a non-limiting aspect of the present disclosure.
Figure 17:
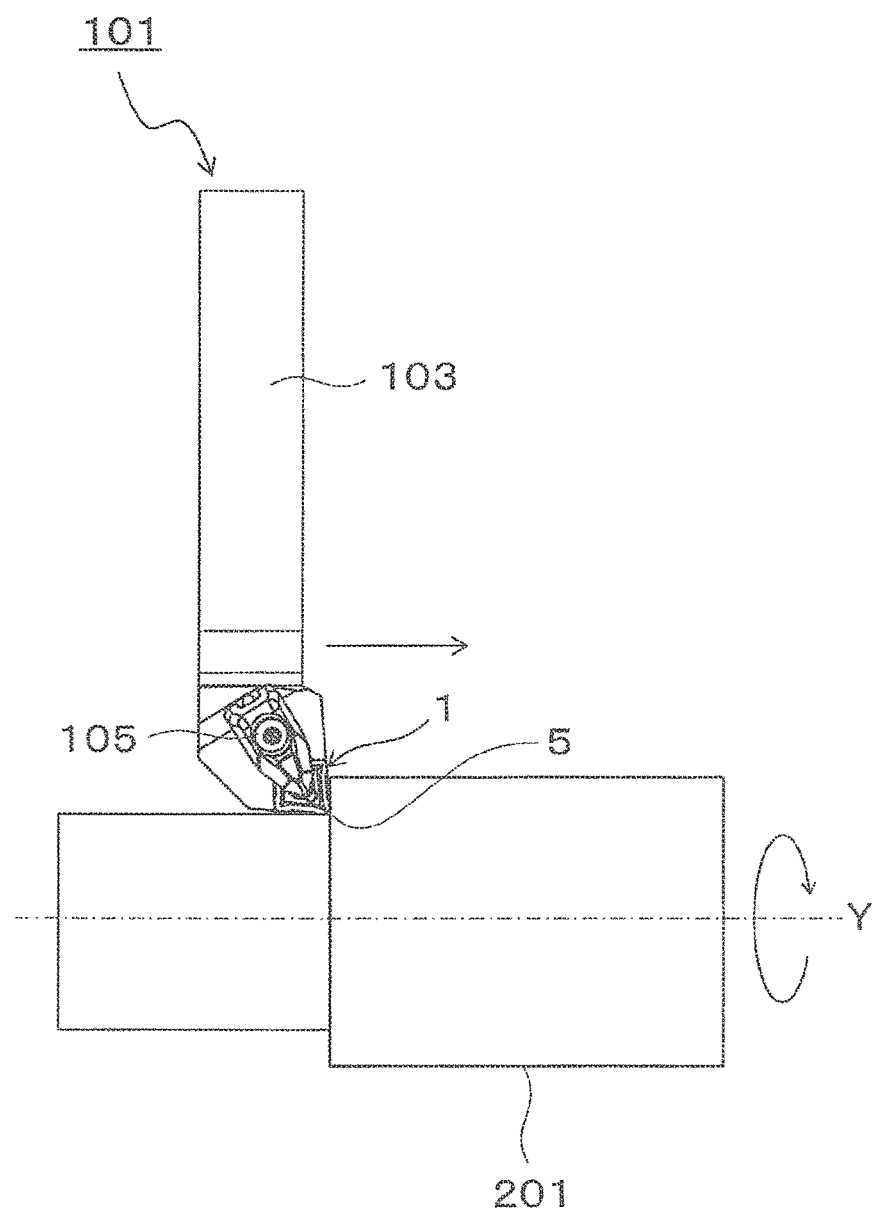
FIG. 17 is a schematic diagram illustrating a step in the method of manufacturing a machined product in a non-limiting aspect of the present disclosure.
Figure 18:
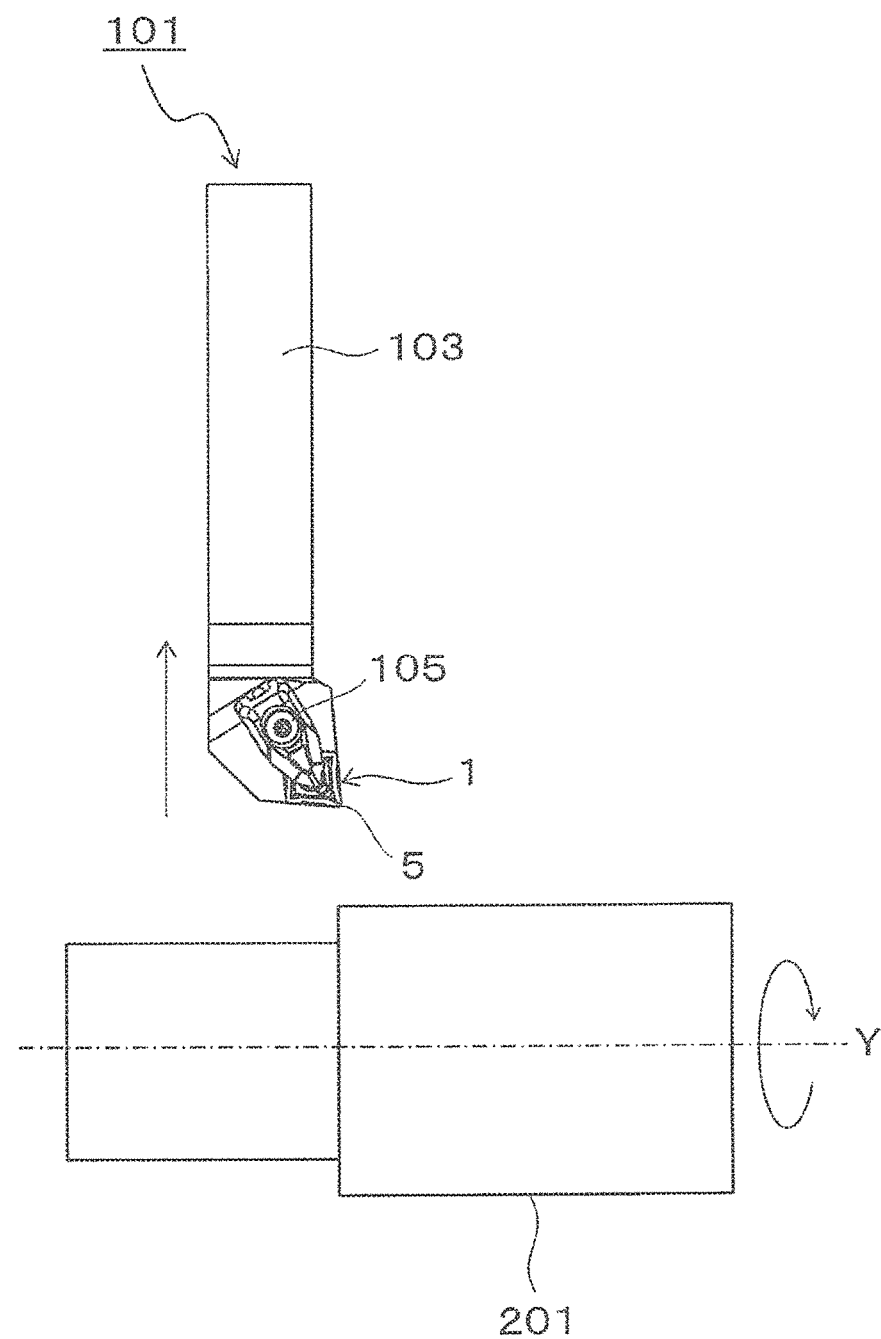
FIG. 18 is a schematic diagram illustrating a step in the method of manufacturing a machined product in a non-limiting aspect of the present disclosure.

The manufacturing method in the present non-limiting aspect of the disclosure includes the following steps:

(1) bringing the cutting tool 101 represented by the above non-limiting aspect of the disclosure relatively near a workpiece 201 in a state in which the workpiece 201 is rotated as illustrated in FIG. 16;

(2) bringing the cutting edge 5 of the cutting tool 101 into contact with the workpiece 201 being rotated as illustrated in FIG. 17; and (3) moving the cutting tool 101 away from the workpiece 201 as illustrated in FIG. 18.

With the method of manufacturing a machined product in the present non-limiting aspect of the disclosure, the cutting tool 101 is capable of providing good cutting performance because the cutting tool 101 includes the insert 1 having the above characteristic configurations and thus makes it possible to reduce the primary boundary damage or the like even during machining a difficult-to-cut material, such as super heat resistant alloys. Hence, good cutting performance can be maintained over a long period of time even under severe cutting conditions, thus leading to enhanced manufacturing efficiency for machined products.

In FIG. 16, the workpiece 201 is rotated and the cutting tool 101 is brought near the workpiece 201 in a state in which a rotation axis Y of the workpiece 201 is fixed. In FIG. 17, the cutting process is carried out by bringing the cutting tool 101 into contact with the workpiece 201 in a state in which the workpiece 201 is rotated. In FIG. 18, the workpiece 201 is rotated and the cutting tool 101 is moved away from the workpiece 201 in a state in which the rotation axis Y is fixed. Although the workpiece 201 is rotated and the cutting tool 101 is moved in the state in which the rotation axis Y is fixed in each of the steps in the present non-limiting aspect of the disclosure, there is, of course, no intention to limit thereto.

For example, the workpiece 201 may be brought near the cutting tool 101 in the step (1). Similarly, the workpiece 201 may be moved away from the cutting tool 101 in the step (3). When the cutting process is continued, it is necessary to repeat the step of bringing the cutting edge 5 of the insert 1 into contact with different portions of the workpiece 201, while keeping the workpiece 201 rotated. When the cutting edge 5 being used is worn out, an unused cutting 5 may be used by rotating the insert 1 180 degrees around the central axis X of the through hole 6, or by turning the insert 1 upside down.

Examples of material of the workpiece 201 include super heat resistant alloy, carbon steel, alloy steel, stainless steel, cast iron, and nonferrous metals. Examples of super heat resistant alloy include nickel-based alloys.

While the non-limiting aspects of the disclosure of the present disclosure have been illustrated and described above, the present disclosure is not limited to the foregoing embodiments of the non-limiting aspects of the disclosure.

It is, of course, possible to make any optional ones in so far as they do not depart from the gist of the present disclosure.

DESCRIPTION OF THE REFERENCE NUMERALS 1 cutting insert (insert)
2 upper surface
21 first side part
22 second side part
23 corner part
24 first part
25 second part
26 third part
3 lower surface
31 lower end surface
4(41) side surface
5 cutting edge
51 first cutting edge
52 second cutting edge
521 third cutting edge
522 fourth cutting edge
6 through hole
71 first surface
711 first surface portion
711a first portion
711b second portion
712 first flat surface portion
712a first region
712a1 portion
712b second region
72 second surface
721 second surface portion
722 second flat surface portion
8 third surface
9 fourth surface
10 portion
101 cutting tool
103 holder
104 insert pocket
105 screw
106 sheet member
107 clamp member
201 workpiece

What is claimed is:

1. A cutting insert, comprising:
an upper surface comprising:
a first side part,
a second side part, and
a corner part located between the first side part and the second side part;
a lower surface located opposite to the upper surface;
a side surface located between the upper surface and the lower surface; and
an upper cutting edge located at an intersection of the upper surface and the side surface, wherein
the upper cutting edge comprises:
a first cutting edge located at the corner part, and
a second cutting edge located at the first side part;
a height of the first cutting edge relative to the lower surface is constant;
the second cutting edge is inclined toward the lower surface as going toward the corner part;
the upper surface comprises:
a first surface located along the first cutting edge and inclined toward the lower surface as going farther from the first cutting edge, and
a second surface locating along the second cutting edge and inclined toward the lower surface as going farther from the second cutting edge;
the first surface comprises a first surface portion which is located along the first cutting edge and has an upwardly protruding curved surface shape;
the second surface comprises a second surface portion which is located along the second cutting edge and has an upwardly protruding curved surface shape;
a radius of curvature of the first surface portion is a first radius;
a radius of curvature of the second surface portion is a second radius; and
the second radius is equal to or greater than the first radius.

2. The cutting insert according to claim 1, wherein
the first surface portion comprises:
a first portion of the first surface, and
a second portion of the first surface that is located closer to the second cutting edge than the first portion of the first surface; and
the first radius in the second portion of the first surface is greater than the first radius in the first portion of the first surface.

3. The cutting insert according to claim 2, wherein
the first radius of the first surface portion increases as going farther from a bisector L of the corner part.

4. The cutting insert according to claim 1, wherein
the first surface further comprises a first flat surface portion located more inward than the first surface portion;
the second surface further comprises a second flat surface portion located more inward than the second surface portion;
an inclination angle of the first flat surface portion relative to the lower surface is a first angle;
an inclination angle of the second flat surface portion relative to the lower surface is a second angle; and
the first angle is greater than the second angle.

5. The cutting insert according to claim 4, wherein
the first flat surface portion comprises a first region and a second region that is located closer to the second cutting edge than the first region, and
the first angle in the second region is smaller than the first angle in the first region.

6. The cutting insert according to claim 5, wherein
the first angle of the first flat surface portion decreases as going farther from a bisector L of the corner part.

7. The cutting insert according to claim 5, wherein
the first region comprises a central portion located on a bisector L of the corner part, and
the central portion is in connection with the first cutting edge.

8. The cutting insert according to claim 4, wherein
the second cutting edge comprises:
a third cutting edge adjacent to the first cutting edge, and
a fourth cutting edge adjacent to the third cutting edge;
the second surface further comprises:
a third surface located along the third cutting edge, and
a fourth surface located along the fourth cutting edge;
a radius of curvature of the second surface portion of the third surface is a third radius;
a radius of curvature of the second surface portion of the fourth surface is a fourth radius;

the third radius is constant;
an inclination angle of the second flat surface portion of the third surface relative to the lower surface is a third angle;
an inclination angle of the second flat surface portion of the fourth surface relative to the lower surface is a fourth angle; and
the third angle decreases as going farther from the corner part.

9. The cutting insert according to claim 8, wherein
the fourth radius increases as going farther from the corner part, and
the fourth angle is constant.

10. The cutting insert according to claim 8, wherein
the intersection comprises a first intersection part which is adjacent to the fourth cutting edge,
the upper surface further comprises:
  a first portion of the upper surface located at a central part of the upper surface, and
  a second portion of the upper surface extending from the first intersection part toward the central part;
a height of the first portion of the upper surface relative to the lower surface is constant; and
a height of the second portion of the upper surface relative to the lower surface is constant and equal to the height of the first portion of the upper surface.

11. The cutting insert according to claim 10, wherein
the upper surface further comprises a third portion of the upper surface having a flat shape and located between the fourth cutting edge and the fourth surface;
the third portion of the upper surface is in connection with the second portion of the upper surface; and
a length of the third portion of the upper surface in a direction vertical to the second cutting edge increases as approaching the second portion of the upper surface in a top view.

12. A cutting tool, comprising:
the cutting insert according to claim 1; and
a holder configured to attach the cutting insert to the holder.

13. A method of manufacturing a machined product, comprising:
rotating a workpiece;
bringing the cutting tool according to claim 12 into contact with the workpiece being rotated; and
moving the cutting tool away from the workpiece.

14. The cutting insert according to claim 1, wherein
the second cutting edge is adjacent to the first cutting edge.

* * * * *